United States Patent [19] [11] 3,898,076
Ranke [45] Aug. 5, 1975

[54] SEALING AND BRIQUETTING FINELY DIVIDED MATERIAL WITH VINYL COPOLYMER AND WAX

[76] Inventor: Robert L. Ranke, 12000 Edgewater Dr., Cleveland, Ohio 44102

[22] Filed: Dec. 14, 1973

[21] Appl. No.: 428,341

Related U.S. Application Data

[63] Continuation of Ser. No. 300,584, Oct. 19, 1972, which is a continuation of Ser. No. 685,269, Nov. 24, 1967.

[52] U.S. Cl. ............... 75/3; 260/28.5 A; 264/122; 264/331
[51] Int. Cl. ........................ C21b 1/26; C22b 1/24
[58] Field of Search .............. 75/3, 94; 260/28.5 A; 148/23, 24; 106/306; 264/15, 122, 126, 331

[56] References Cited
UNITED STATES PATENTS

| | | | |
|---|---|---|---|
| 1,002,133 | 8/1911 | Bryant et al. | 75/93 A |
| 2,234,994 | 3/1941 | Vernon et al. | 264/126 X |
| 2,472,025 | 5/1949 | Peake et al. | 75/94 X |
| 2,577,923 | 12/1951 | Scott et al. | 264/126 X |
| 2,602,193 | 7/1952 | Korkatti | 264/126 X |
| 2,834,660 | 5/1958 | Eisenheit et al. | 264/126 X |
| 2,888,342 | 5/1959 | Fraser | 75/3 |
| 2,927,852 | 3/1960 | Bowden | 75/44 R |
| 2,935,397 | 5/1960 | Saunders et al. | 75/44 R |
| 3,027,227 | 3/1962 | Coxey | 75/44 R |
| 3,146,214 | 8/1964 | Jakaitis et al. | 260/28.5 A V |
| 3,177,274 | 4/1965 | Pratt et al. | 264/126 |
| 3,189,573 | 6/1965 | Open | 260/28.5 AV |

FOREIGN PATENTS OR APPLICATIONS

| | | |
|---|---|---|
| 349,873 | 6/1931 United Kingdom | 148/23 |

*Primary Examiner*—Allen B. Curtis
*Attorney, Agent, or Firm*—Mason, Fenwick & Lawrence

[57] ABSTRACT

An ethylene/vinyl acetate resin copolymer mixed with paraffin wax coats and binds finely divided materials compressed into a briquette for addition to molten metal. The binder, which forms a minor portion of the total briquette, may be extended by first coating one of the finely divided materials intended for incorporation in the briquette whereby a very small percentage of the binder is thoroughly and evenly distributed throughout the briquette.

16 Claims, No Drawings

SEALING AND BRIQUETTING FINELY DIVIDED MATERIAL WITH VINYL COPOLYMER AND WAX

This is a continuation of application Ser. No. 300,584, filed Oct. 19, 1972, now abandoned.

This application is a continuation-in-part of my copending application Ser. No. 600,708, filed Dec. 12, 1966, and of my copending application Ser. No. 592,237, filed Nov. 4, 1966 (now abandoned), which in turn is a continuation of my copending application Ser. No. 339,348, filed Jan. 22, 1964 (now abandoned), which in turn was a continuation in part of Ser. No. 326,268, filed Nov. 26, 1963 (now abandoned).

This invention belongs in the field of metallurgy and more particularly to the treating of molten steel with solid treating agents added to the molten metallic bath in briquette form.

The prior art is exemplified in Saunders et al, U.S. Pat. No. 2,935,397, granted May 3, 1960, which teaches an addition of a briquette containing finely divided alloying materials with aluminum and flux and utilizing as a binder an organic material selected from the group consisting of abietic acid, complexes thereof, and wood rosins. This prior art briquette will not withstand rough handling in the steel mill and is capable of adding undesirable amounts of carbon to the molten steel in a ladle after tapping.

The present invention solves the above problem by utilizing as a binder a copolymer of an alkylene compound having two to four carbon atoms and a vinyl ester of a one- to six- carbon saturated monobasic aliphatic carboxylic acid, hereinafter sometimes referred to as an ethylene/vinyl acetate resin copolymer, containing from about 17 to 42 per cent of the vinyl acetate and mixed with a fully refined paraffin wax in the proportions of approximately 80 to 50 per cent of the wax to 20 to 50 per cent of the resin copolymer. This binder is almost completely evaporated when the briquettes are added to a molten steel bath, thus avoiding the addition of undesired elements to the metal bath. Furthermore, the improved briquette of this invention will withstand repeated drops from six to ten feet onto a solid floor.

In carrying out this invention, the best briquetting sealant and binder material I have discovered utilizes a high molecular weight resin copolymer containing between about 17 per cent to 42 per cent of a vinyl ester and between about 83 per cent to 58 per cent of a copolymerizable alkylene compound having two to four carbon atoms, this resin copolymer dissolved in a compatible was having a melting point between about 125° F and 160° F, said mixture comprising from about 20 to 50 per cent of the resin copolymer and about 80 to 50 per cent of said paraffin wax. A suitable form of the binder is an ethylene/vinyl acetate resin copolymer containing from about 17 to 42 per cent of the vinyl acetate, said copolymer having a melt index measured in g./10 min. (ASTM D 1238 modified) from 1.6 to 500.0, having an inherent viscosity at 30° C (0.25 g./100 ml. toluene) from 0.45 to 1.05, having a density in grams per cubic centimeter at 23° C (ASTM D 1505) from 0.937 to 0.965, having a tensile strength (ASTM D 882) from 250 p.s.i. to 3100 p.s.i. utilizing specimens having a cross section of three-quarter inches by three-sixteenths inches and from 0.010 to 0.125 inches long, having an elongation at the breaking point (ASTM D 882) from 420 per cent to 1300 per cent, having a hardness measured by Shore A-2 Durometer, 10 seconds, (ASTM D 1706) from 35 to 88, having a softening point, Ring and Ball, (ASTM E28) from 180° F to 390° F, and being insoluble in aqueous mixtures. A modification of said binder is an ethyl/vinyl acetate resin copolymer containing about 1.0 per cent by weight of an acrylic or methacrylic acid.

Either of said resin copolymer is dissolved in approximately 125° F to 160° F melting point fully refined paraffin wax in the proportions of approximately 80 to 50 per cent wax to 20 to 50 per cent resin. The above mentioned binder may be heated and thoroughly mixed with the finely divided material to be briquetted and then formed directly into briquettes or the mixture of wax and resin may be heated and thoroughly mixed, then cooled and finely divided, then thoroughly mixed with the finely divided material to be briquetted and the briquette formed under compression together with heat if required. In a preferred method according to this invention, a finely divided extender material, such as a flux or a nitrogen-bearing material in a briquette for addition to steel, is very finely divided, even to a flour-like form, then the binder material is heated and thoroughly mixed with the flux and/or nitrogen-bearing material acting as an extender until all of the extender particles are thoroughly coated with the binder material. This extended resin-wax mixture is then cooled, then finely divided, then thoroughly mixed with the materials to be briquetted and thereafter formed into a briquette using pressure, together with heat if necessary.

The paraffin wax is completely compatible with the resin copolymer and blends completely therewith. The material which I have discovered best adapted to my purpose is formed from such a vinyl copolymer produced by E. I. DuPont de Nemours and Company and marketed under the trade name ELVAX which is mixed with paraffin wax in the proportions mentioned above and sold by Trans Penn Wax Corporation of Titusville, Pennsylvania, as ELVAX Wax Blend under various brand numbers.

Suitable vinyl copolymers for incorporation into the briquette in the form of a resin/wax blend are copolymers of a vinyl ester, that is preferably vinyl acetate and a copolymerizable alkylene compound preferably having two to four carbon atoms such as ethylene, propylene and isobutylene. By far the best results are obtained with ethylene as the alkylene compound and vinyl acetate as the vinyl ester, but also some improved properties often can be obtained using propylene as the alkylene component and vinyl formate or vinyl propionate as the vinyl ester component of the copolymer. The preferred amount of vinyl ester in the ethylene/vinyl ester copolymer is about 25 to 29 per cent by weight of the vinyl ester copolymer although copolymers having 17 to 42 per cent by weight of vinyl ester can be used blended with the wax to form the binder material of this invention.

Suitable paraffin waxes for the above described resin/wax blend are those consisting primarily of straight chain (normal paraffin hydrocarbons of the $C_n H_{2n} + 2$ series having average molecular weights of about 360 to 420 with the individual components generally having from 20 to 30 carbon atoms. The preferred paraffin wax is fully refined paraffin wax which is obtained by dewaxing and deoiling a petroleum wax distillate. The preferred fully refined wax has a maximum oil content of about 0.5 per cent by weight and is nearly white in color and has practically no odor. Excellent results have been obtained by using a fully refined paraffin wax having a melting point of about 140° F, the preferred melting point range being about 135° to 145° F although waxes having a melting point from about 125° F to about 160° F, or more, can provide a suitable blending material for the previously described copolymer of vinyl acetate. Another suitable wax for mixing with the resin copolymer of this invention is beeswax with a melting point between 140° and 150° F.

As previously indicated, the best results are obtained with a resin/wax blend of about 30 parts resin and 70 parts wax although good results have been obtained with 25 to 35 parts of resin per 65 to 75 parts of wax. In some cases, especially where the resultant briquettes are not subjected to rough handling, the resin/wax ratio can vary from 50/50 to about 20/80.

Many times difficulties are encountered in handling large quantities of finely divided material, partly because the material is hard to handle in that form or is blown where not wanted, and partly because when it is mixed chemically or metallurgically with other materials, it is not easily added. Examples of such materials are finely divided ferroalloys of chromium, vanadium, titanium, boron, manganese, and others. Referring particularly to manganese additions to molten steel, large volumes of ferro-manganese fines present the problem of heavy losses and the problem of efficiently adding them to molten steel, when it is tapped. The manganese content of these fines varies considerably but commonly runs from 60 per cent up to a little above 90 per cent. A similar manganese addition having the same problem is known as electrolytic manganese which is an extremely fine gray powder having approximately 99.5 per cent manganese with 0.5 per cent traces of other elements. My invention teaches how to briquette such ferromanganese fines or electrolytic manganeses.

In making up approximately 2 pound briquettes of the above materials, I first measured out approximately 2 pounds of the ferromanganese fines or of the electrolytic manganese fine materials, hereinafter jointly referred to as "manganese-rich" material, and then took varying amounts of the above mentioned preferred "Elvax Wax Blend" (having 27 to 29 per cent vinyl acetate in the copolymer) in the cold state, and chopped up or finely divided the Elvax Wax Blend material. I then thoroughly mixed the finely divided Elvax Wax Blend material with the finely divided ferromanganese or electrolytic manganese material until the same was thoroughly incorporated. Each approximately two pound briquette, approximately spherical but having a short intermediate cylindrical portion, was then compressed in a briquetting press under 5,000 lb./sq. in. to 50,000 lb./sq. in. pressure. These briquettes were then heated in an oven the temperature of which was held between 125° F and 350° F. The baking period was from 1¼ to 3 hours. The briquette was then allowed to cool to room temperature. This provided a briquette which was very dense and hard and which withstood repeated 6 foot drop tests on a concrete floor and also withstood at least one 18 foot drop to a concrete floor without breaking of the briquette.

In the above mentioned briquettes, the amount of the Elvax Wax Blend material in an approximately two pound briquette wax varied from a low figure of approximately one-eighth of an ounce to a high figure of approximately 1 ounce. The ferromanganese fines in one of these tests comprised 26 per cent of material which passed through four mesh sieve and was held on an eight mesh sieve while 74 per cent passed through the eight mesh sieve and was held on a fourteen mesh sieve. In other examples, the ferromanganese fines comprised 100 per cent of material which was passed through eighteen mesh sieve. All these mixtures gave satisfactory briquettes.

Aluminum and manganese are common additions to molten steel both for deoxidizing and desulphurizing effects, but also for the purpose of adding manganese to the steel. However, by providing fluxing materials, finely divided and evenly mixed with the aluminum and ferromanganese in a unitary briquette, certain new advantages are provided. There is an immediate and effective fluxing of the deoxidation products and the fluxes are present when the oxidation products are formed due to the addition of the aluminum and ferromanganese to the molten steel. Thus, the fluxing takes place simultaneously with the production of the deoxidation products so as to prevent inclusions in the steel. The flux materials are generally accepted as having lower melting temperatures, which thereby permit continuous fluxing during the tapping operation. By providing a briquette which carries the flux materials down beneath the surface of the molten steel, the flux release is somewhat delayed and, therefore, provides a more uniform fluxing throughout the tap. There is, thus, a more effective removal of oxides, other than aluminum oxide, together with silica inclusions.

A further advantage of the above mentioned briquette is the improvement in desulphurization of the steel. The heavy manganese material carries the briquette well below the surface of the molten bath, thus producing a deeper penetration of the fluxes into the molten material, and thus the manganese more efficiently cooperates there in the removal of sulphur. The flux release is delayed because of the sinking effect due to the heavy density of the briquette which, carried down into the steel bath, melts more slowly and the flux is volatilized at a temperature below 2,900° F so that carrying the briquette below the level of the bath is helpful, and the addition of the briquette is possible throughout the tap even though the temperature of the tapped steel may fall slightly during the course of the process.

However, such a briquette containing lime as a flux, without this invention cannot be kept more than twenty-four hours due to the fact that the lime readily absorbs water and moisture so that the briquette falls apart. The present invention provides a solution to this problem by first completely enclosing each lime particle in the Elvax Wax Blend sealant material thus protecting the enclosed lime against the action of moisture. The cooled cake, as above described, is then finely divided and thoroughly mixed with the other materials to be briquetted. This sealant also firmly bonds the particles of the briquette, such as the finely divided particles of ferromanganese, aluminum and also fluxes if used.

For various kinds of steel, a briquette containing ferromanganese and aluminum, preferably also fluxes, may be made up according to the use desired. Such briquettes will usually contain ferromanganese from 50 to 98 per cent, aluminum from 42½ to 1 per cent, and fluxes from 10 per cent to 1 per cent. Such fluxes would normally be chosen from the group consisting of sodium carbonate, limestone, lime, cryolite, fluorspar, borax, sodium fluoride, magnesium carbonate and sodium aluminate. In making up such a briquette, I may take the resin-wax blend material at toom temperature, finely divide the same, and thoroughly mix it with finely divided manganese-rich material and aluminum in the percentages mentioned above. This material may then be briquetted under heavy pressure and with temperature applied if desired as mentioned above.

A preferred method of forming a briquette containing manganese as the alloying material, or any of the other metal alloys hereinafter later mentioned, is to use another finely divided solid material as an extender for the resin-wax material so as to more thoroughly incorporate it throughout the briquette. For instance, if I am using fluorspar as a flux, I melt a minimum of approximately 20 per cent of the resin-wax blend with 80 per cent finely divided fluorspar and then mix it thoroughly as in a dough mixer. The mixer may be heated if necessary to get all of the fluorspar particles covered with the resin-wax blend. In the process of mixing, the two materials unite and become "sandy." The mixed materials are then removed from the mixer and after cooling, the aggregate is broken up so as to pass through a screen of preferably eight to ten mesh, although it may be broken up to pass through a smaller mesh screen depending upon the volume of this extended binder which is needed. The more finely divided the particles, the more thoroughly they are distributed throughout the metal to be briquetted. I may use about 1½ ounces of the resin-wax blend as a minimum to every 38 ounces of total material briquetted to give a reasonably hard briquette. For rougher handling of briquettes, I prefer to use about 30 per cent of the resin-wax blend mixed with 70 per cent of the fluorspar, as extender, and use about 6 per cent of this mix for the binder. For extremely rough handling of briquettes, and where the metal particle size is larger, I may use 35 per cent of the resin-wax blend mixed with 65 per cent of the fluorspar as an extender. The relationship of the resin-wax blend to the flux material needs to be varied depending upon the absorption qualities of the flux. For instance, where I might use 40 parts of the resin-wax blend to 100 parts of fluorspar, I would use about 50 parts of the resin-wax blend to 100 parts of cryolite.

An example of such a briquette containing ferromanganese, aluminum and flux would contain 23.5 ounces ferromanganese, 12.5 ounces aluminum, and 2.5 ounces of flux-binder wherein were incorporated 0.75 ounces resin-wax blend and 1.75 ounces fluorspar.

Certain materials used in industry cause difficulty during storage or handling because they are either water-soluble or destroyed or deteriorated by water before they can be put to their intended use. I have lumped these materials all together and hereinafter refer to them in the specification and claims as "water deterioratable." Many of such materials are used as additions to molten steel, and my invention provides means for sealing and protecting such water deterioratable materials until they are used whether they are incorporated in briquettes or not. Among other such materials I am including specifically such steel making materials as lime, pentahydrate borax, sodium fluoride, soda ash, sodium carbonate, sodium and potassium nitrate, and other finely divided materials. The above mentioned "Elvax Wax Blend" I find is an ideal sealant for such water deterioratable materials.

In applying my invention to lime, the above mentioned Elvax Wax Blend was first melted to a readily flowable condition and the lime was then thoroughly mixed into it. In this case the lime was in the form of powdered CaO and was in the proportion of 0.60 ounces of lime to each 0.25 ounces of Elvax Wax Blend, dry weight. This coated every particle of lime with the hot Elvax sealant material. This mixture was then cooled to a solid cake which was later chopped or grated into a very finely divided form if the purpose was to mix the same further as in a briquette to be later described. I have varied the above proportions of materials and have obtained suitable sealing action of the lime throughout the range running from 26 per cent of the Elvax Wax Blend to 25 per cent lime. Usually, the higher percentage of the Elvax Wax Blend will be used not solely for the purpose of sealing the lime but to act as a binder when the coated lime is incorporated in a briquette with other materials.

In the above discussion of percentages of Elvax Wax Blend and lime, it must be pointed out that this relationship will vary with the screen size of the lime. The figures shown above are in connection with lime in the grades of 50 mesh and finer. Also, the percentage of Elvax Wax Blend with relation to the lime will vary with the intended final sizing of the finely divided particles of the mixture after the lime is coated. The finer the desired division after coating, the higher the percentage of the Elvax Wax Blend is needed to contain the lime particles.

The above procedure is used with any of the other water deterioratable materials. They are reduced to a finely divided form, the Elvax Wax Blend is melted to a readily flowable condition and the water deterioratable material is thoroughly mixed into the sealant material. This mixture may then be cooled and utilized in any desired fashion.

It should be understood that preferably any of the briquettes herein discussed of any particular type would be uniformly constructed so that merely counting a given number of briquettes would give the operator the total amount of elements added in the molten bath. By this I mean that the individual elements in briquettes of a uniform construction would be carefully weighed so that each briquette in a given batch would contain the same amount, for instance, of ferromanganese, of aluminum and of the selected flux or fluxes.

It will be recognized that the resin-wax binder material of this invention would almost completely volatilize or burn at the temperature of a molten steel bath so that the total increase of carbon in the steel, due to these briquette additions, would be negligible.

Materials other than manganese which might be briquetted according to the teachings of this invention include ferro-vanadium, ferro-titanium, ferro-columbium, ferro-silicon, silico-manganese, calcium, boron, lithium, magnesium, chromium, zirconium and tungsten, either alone or in desired combinations. These materials are hereinafter sometimes referred to as "additive materials."

EXAMPLE I

| | |
|---|---|
| 37.50 | ounces ferro-manganese |
| 0.75 | ounces resin-wax blend |
| 38.25 | ounces total weight of briquette. |

These materials must be thoroughly mixed and pressure briquetted and heat applied for a minimum of 2½ hours at between 250° F and 300° F.

EXAMPLE II

| | |
|---|---|
| 37.50 | ounces ferro-manganese |
| 3.50 | ounces resin-wax blend |
| 41.00 | ounces total weight of briquette. |

These materials must be thoroughly mixed and pressure briquetted. With this amount of binder, heating is not necessary.

EXAMPLE III

| | |
|---|---|
| 23.50 | ounces ferro-manganese |
| 12.50 | ounces aluminum or ferro-titanium |
| 0.50 | ounces resin-wax blend |
| 36.50 | ounces total weight of briquette. |

EXAMPLE IV

| | |
|---|---|
| 23.50 | ounces ferro-manganese |
| 12.50 | ounces aluminum |
| 1.75 | ounces fluorspar |
| 0.75 | ounces resin-wax blend |
| 38.50 | ounces total weight of briquette. |

In the above example, the fluorspar would be first mixed with the resin-wax blend as an extender thereof as herein explained, which material is then cooled and finely divided and thoroughly mixed with the ferro-manganese and aluminum, after which the briquette is formed by compression and heating as described.

EXAMPLE V

| | |
|---|---|
| 29.00 | ounces ferro-manganese |
| 10.00 | ounces calcium cyanide |
| 2.00 | ounces resin-wax blend |
| 41.00 | ounces total weight of briquette. |

In the above example, the calcium cyanide would be utilized as an extender for the resin-wax blend as previously described and later incorporated with the ferro-maganese to form a briquette under pressure. Heat may then be applied for about 1¾ hours to 2½ hours at between 175° and 225° F, which makes a very hard briquette.

EXAMPLE VI

| | |
|---|---|
| 54.00 | ounces ferro-manganese |
| 5.40 | ounces dicyandiamide |
| 2.10 | ounces resin-wax blend |
| 61.50 | ounces total weight of briquette. |

Here again, the dicyandiamide would be mixed with the resin-wax blend as an extender, after which the briquettes would be formed as mentioned above.

Another nitrogen bearing material which may be used in this invention is urea.

EXAMPLE VII

| | |
|---|---|
| 29.00 | ounces ferro-manganese |
| 5.00 | ounces fluorspar |

-Continued

| | |
|---|---|
| 3.60 | ounces dicyandiamide |
| 3.40 | ounces resin-wax blend |
| 41.00 | ounces total weight of briquette |

In the above briquette the fluorspar and dicyandiamide would be utilized as extenders of the resin-wax blend preliminary to forming the briquette as previously described, after which it would be cooled, comminuted and mixed with the ferro-manganese and briquetted under pressure and heated for the time period and at the temperature mentioned in Examples V and VI.

EXAMPLE VIII

| | |
|---|---|
| 21.00 | ounces ferro-manganese |
| 5.10 | ounces fluorspar |
| 4.50 | ounces dicyandiamide |
| 2.40 | ounces resin-wax blend |
| 41.00 | ounces total weight of briquette. |

In the above briquette the fluorspar and dicyandiamide are utilized as extenders of the resin-wax blend preliminary to forming the briquette as previously described, after which it is cooled, finely divided and mixed with the ferro-manganese and briquetted under pressure and heated for the time period and at the temperature mentioned in Examples V and VI. The ferro-manganese utilized in this Example is known as standard ferro-manganese with carbon up to 7 per cent, manganese 74 to 76 per cent, silicon 1 per cent, and the balance iron.

EXAMPLE IX

| | |
|---|---|
| 52.50 | ounces ferro-manganese |
| 0.92 | ounces fluorspar |
| 6.32 | ounces dicyandiamide |
| 1.76 | ounces resin-wax blend |
| 61.50 | ounces total weight of briquette. |

In the above briquette the fluorspar and dicyandiamide would be utilized as extenders of the resin-wax blend preliminary to forming the briquette as previously described, after which it is cooled, finely divided and mixed with the ferro-manganese and briquetted under pressure and heated for the time period and at the temperature mentioned in Examples V and VI. The ferro-manganese in this Example is known as medium carbon ferro-manganese having 1½ per cent maximum carbon, 80 per cent contained manganese, 1½ per cent silicon maximum, and the balance iron.

EXAMPLE X

| | |
|---|---|
| 29.00 | ounces iron or iron oxide |
| 12.00 | ounces dicyandiamide |
| 41.00 | ounces total weight of briquette. |

This Example was finely divided iron or iron oxide. I may also use the same amount of what is known as "deseamer dust" which contains about 60 per cent iron and about 30 per cent iron oxide. In the above briquette, both ingredients are finely divided and thoroughly mixed and then compressed into a briquette under heavy pressure as previously mentioned, and with or without heating or baking. In this Example, the dicyandiamide acts as the binder to hold the entire briquette together.

Briquettes like those mentioned above for addition to steel may have added to them finely divided exothermic materials so that when the resulting product is added to the molten steel ladle, sufficient heat is derived from the termo-chemical reactions to maintain steel fluidity. This type of addition is specifically designed for use in producing high carbon-high manganese steels where, if cold alloys only were used to meet the higher carbon-manganese specifications, freezing, or "skulling" would take place. The amount of exothermic materials and the type thereof used depends on the required concentrations of alloys and the amount of heat necessary to maintain ladle temperatures for varying size of heat and varying size of ladle. The amount of exothermic materials used is less than 20 per cent of the total weight, and the mixture used is a function of consumer internal cleanliness and chemistry requirements.

As an example of the exothermic type of briquette, the total material of the briquette would be divided approximately as follows. The ferro-manganese or electrolytic manganese would be between approximately 80 and 90 per cent of the total briquette. Aluminum would be between 0.5 and 5.0 per cent of the total briquette. The exothermic material, composed of various combinations of sodium nitrate, potassium nitrate, iron oxide, powdered iron, alumina, and sodium carbonate, is between 2 per cent and 18 per cent of the total briquette.

A specific briquette of this character was made up as follows: 27.20 ounces of regular carbon ferro-manganese fines (6 per cent carbon), 1.56 ounces sodium nitrate sealingly coated with 1.00 ounces Elvax Wax Blend, 2.56 ounces of ferro-silicon fines (49 per cent silicon), and 0.50 ounces of free Elvax Wax Blend. In making this briquette, the 1 ounce of Elvax Wax Blend was first melted to a freely flowing condition and then the finely divided sodium nitrate was thoroughly mixed into the same, the mixture was allowed to cool as a cake which was then finely divided as above described in connection with the sealing action of Elvax Wax Blend and lime. Then the 0.50 ounces of free Elvax Wax Blend was also finely divided and then all of the Elvax Wax Blend containing material was thoroughly mixed with the ferro-manganese and ferro-silicon. The thoroughly mixed materials were then fed to a briquetting machine and compressed under approximately 100 tons pressure. The briquette was then baked in an oven at a temperature between 150° and 320° F for a period of 1½ to 2½ hours and then allowed to cool. This briquette was very firm and stood repeated drops from 6 feet onto a concrete floor.

Another similar briquette containing exothermic materials was composed as follows: 28.0 ounces of medium carbon ferro-manganese fines, regular grade (1.25 per cent carbon), 1.56 ounces of sodium nitrate sealed with 1.00 ounces of Elvax Wax Blend, 1.60 ounces of ferro-silicon fines (49 per cent silicon), 0.96 ounces aluminum finely divided, and 0.50 ounces of free Elvax Wax Blend. The above materials were combined exactly as in the preceding exothermic briquette case. The 1.56 ounces of sodium nitrate, finely divided, was mixed with the 1 ounce of heated Elvax Wax Blend, then cooled and finely divided. The 0.50 ounces of Elvax Wax Blend was also finely divided and then these materials were thoroughly mixed with the ferro-manganese, ferro-silicon and aluminum. The mixed materials were then fed to a briquetting machine and baked in an oven exactly as mentioned in the case of the previously described exothermic briquette. This also resulted in a very firm briquette which stood repeated drops from 6 feet onto a concrete floor.

In each of the above last two mentioned cases, the exothermic briquette was used as steel was tapped from a steel-making furnace by placing approximately 1,500 pounds of the briquetted material on the bottom of the ladle just before tapping, and then during the tap, another approximately 1,500 pounds of the briquetted material was thrown into the chute along with other additions as the molten steel flowed into the ladle. The result in each case was good from a metallurgical as well as from an exothermic point of view in that sufficient steel fluidity was maintained and the additions were evenly absorbed throughout the heat.

Another example of a briquette for rimming steel to contain 0.06 maximum carbon and 0.03 to 0.05 vanadium is as follows:

EXAMPLE XI

| | |
|---|---|
| 19.90 | ounces ferro-manganese (1½% carbon, 80% contained manganese) |
| 17.55 | ounces ferro-manganese (standard, about 75% contained manganese) |
| 9.45 | ounces ferro-vanadium (55% contained vanadium) |
| 0.65 | ounces aluminum |
| 1.65 | ounces fluxes |
| 0.80 | resin-wax blend |

A briquette for addition to a fully-killed steel containing ferro-vanadium is as follows:

EXAMPLE XII

| | |
|---|---|
| 33.50 | ounces ferro-manganese (standard, about 75% contained manganese) |
| 5.00 | ounces silico-manganese |
| 4.00 | ounces ferro-vanadium (55% contained vanadium) |
| 6.00 | ounces aluminum |
| 0.80 | ounces fluxes |
| 0.75 | ounces resin-wax blend |

A similar addition for a ferro-columbium heat would be identical with Example XII except substituting 4.10 ounces of ferro-columbium for the ferro-vanadium.

Another example of a briquette for addition to a semi-killed heat of steel having ferro-columbium addition is as follows:

EXAMPLE XIII

| | |
|---|---|
| 32.70 | ounces ferro-manganese (standard, about 75% contained manganese) |
| 11.40 | ounces silico-manganese (18% contained silicon, 68% contained manganese) |
| 4.70 | ounces ferro-columbium (42% contained columbium) |
| 0.85 | ounces fluxes |
| 0.75 | ounces resin-wax blend |

In Examples XI, XII and XII, the briquette could be formed as previously mentioned omitting the aluminum and fluxes if they were to be added separately. Also, in each case, a preferred manner of forming the briquette would be to mix the hot resin-wax blend with the fluxes, chosen from the fluxes previously mentioned herein, as an extender, then the material would be cooled and finely divided and mixed with the other materials, after which the entire aggregate would be briquetted under heavy pressure and thereafter heated if necessary. It should be understood in evaluating this invention that where a minimum of the resin-wax blend is utilized, heat will be necessary to finally harden the briquette. However, in some of the briquettes where a larger amount of resin-wax blend is added, heat is not always necessary. The pressure used in forming these briquettes is preferably between 5,000 and 50,000 pounds per square inch of briquette. A preferred shape of the briquette is one which is generally spherical, although it may have a short cylindrical portion preferably about three-quarter inches in diameter on opposite sides of which are generally hemispherical ends. This briquette will roll easily down a chute for addition to a steel ladle.

Another ethylene/vinyl acetate resin copolymer which may be used in any of the examples mentioned herein contains at least 65 per cent ethylene, at least 5 per cent by weight of a vinyl ester of a lower (1– 6– carbon) saturated monobasic aliphatic carboxylic acid, and 0.01 to 10 per cent by weight of an acid of the group consisting of acrylic and methacrylic acids, this copolymer being made by a free-radical initiated polymerization of a mixture of ethylene, the vinyl ester and the acid.

What is claimed is:

1. The method of briquetting finely divided solid material for addition to a molten metal bath comprising hot mixing a copolymer of an alkylene compound having two to four carbon atoms and a vinyl ester chosen from the group consisting of vinyl acetate, vinyl formate and vinyl proprionate containing from 17 to 42 per cent vinyl ester and said copolymer having a melt index from 1.6 to 500.0, having inherent viscosity at 30° C from 0.45 to 1.05, having a density in gm. per cc. at 23° C from 0.937 to 0.965, having a tensile strength from 250 p.s.i. to 3,100 p.s.i., having a hardness measured by Shore A-2 Durometer, 10 sec., from 35 to 88, having a softening point measured by Ring and Ball from 180°F to 390°F, and insoluble in aqueous mixtures; with approximately 125°F to 160°F melting point paraffin wax in the proportions of approximately 80 to 50 per cent wax to 20 to 50 per cent resin until said resin is dissolved, thoroughly mixing a minor amount of said resin-wax mixture with and binding said finely divided solid material, and compressing the same to form a briquette of said finely divided solid material.

2. The method of claim 1 wherein said thorough mixing includes cooling and finely comminuting said resin-wax mixture; thoroughly mixing said finely comminuted mixture with said finely divided solid material to provide an aggregate; and compressing said aggregate under heavy pressure into a briquette.

3. The method of claim 2 including a final step of heating said briquette at a temperature of about 150° F to 350° F for about 1¼ to 3 hours.

4. The method of claim 1 wherein said thorough mixing includes thoroughly mixing said resin-wax mixture with a finely divided solid extender material, thoroughly mixing said extended resin-wax mixture with said first-named solid material; and compressing the same into a briquette.

5. The method of claim 1 wherein said thorough mixing includes thoroughly mixing said hot resin-wax mixture with a finely divided solid extender material; cooling and finely comminuting said extended resin-wax mixture; thoroughly mixing said finely comminuted extended resin-wax mixture with said finely divided solid material to provide an aggregate; and compressing said aggregate under heavy pressure into a briquette.

6. The method of claim 5 including the final step of heating said briquette at a temperature of about 150° F to 350° F for about 1¼ to 3 hours.

7. The method of claim 1 wherein said solid material includes at least one of the metallic materials chosen from the group consisting of aluminum, electrolytic manganese, ferro-manganese, ferro-vanadium, ferro-titanium, ferro-columbium, ferro-silicon, silico-manganese, calcium, boron, lithium, magnesium, chromium, zirconium and tungsten.

8. The method of claim 4 wherein said solid extender material includes at least one of the flux materials chosen from the group consisting of sodium carbonate, limestone, lime, cryolite and fluorspar.

9. The method of claim 4 wherein said solid extender material includes at least one of the nitrogen bearing materials chosen from the group consisting of calcium cyanimide, dicyandiamide and urea.

10. A briquette for addition to a molten metal bath comprising a major portion of an alloying material other than aluminum finely divided, and from about 0.4 per cent to 10.0 per cent of a binder thoroughly mixed with and firmly bonding said alloying material; said binder comprising a copolymer of an alkylene compound having two to four carbon atoms and a vinyl ester chosen from the group consisting of vinyl acetate, vinyl formate and vinyl proprionate containing from 17 to 42 per cent vinyl ester and said copolymer having a melt index from 1.6 to 500.0, having inherent viscosity at 30° C from 0.45 to 1.05, having a density in gm. per cc at 23° C from 0.937 to 0.965, having a tensile strength from 250 p.s.i. to 3100 p.s.i., having a hardness measured by Shore A-2 Durometer, 10 sec., from 35 to 88, having softening point measured by Ring and Ball from 180° F to 390° F, and insoluble in aqueous mixtures; and said resin copolymer dissolved in approximately 125° F to 160° F melting point fully refined paraffin wax in the proportions of approximately 80 to 50 per cent wax to 20 to 50 per cent resin.

11. A briquette as defined in claim 10 including a minor portion of finely divided aluminum thoroughly mixed in said alloying material.

12. A briquette as defined in claim 11 including from 1.0 to 10.0 per cent of a finely divided flux material thoroughly mixed in said alloying material, said flux material chosen from the group consisting of sodium carbonate, limestone, lime, cryolite and fluorspar.

13. A briquette as defined in claim 10 intended for addition to molten steel wherein said alloying material is a manganese-rich material comprising about 50.0 to 98.0 per cent of said briquetted material, including also about 42.5 to 1.0 per cent of said briquetted material as finely divided aluminum, and including also about 10.0 to 1.0 per cent of said briquetted material as a finely divided flux comprising at least one of the materials chosen from the group consisting of sodium carbonate, limestone, lime, cryolite, fluorspar, borax, sodium fluoride, magnesium carbonate and sodium aluminate.

14. A briquette as defined in claim 10 including from about 2 per cent to about 18 per cent of an exothermic material chosen from the group consisting of sodium nitrate, potassium nitrate, iron oxide, powdered iron, alumina and sodium carbonate.

15. A briquette for addition to a molten metal bath comprising a major portion of an alloying material other than aluminum finely divided, and a minor amount of a binder thoroughly mixed with and firmly bonding said alloying material; said binder comprising a copolymer of an alkylene compound having two to four carbon atoms and a vinyl ester chosen from the group consisting of vinyl acetate, vinyl formate and vinyl proprionate containing from 17 to 42 per cent vinyl ester and said copolymer having a melt index from 1.6 to 500.0, having inherent viscosity at 30° C from 0.45 to 1.05 having a density in gm. per cc at 23° C from 0.937 to 0.965, having a tensile strength from 150 p.s.i. to 3,100 p.s.i., having a hardness measured by Shore A-2 Durometer, 10 sec., from 35 to 88, having softening point measured by Ring and Ball from 180° F to 390°F, and insoluble in aqueous mixtures, and said resin copolymer dissolved in approximately 125° F to 160° F melting point fully refined paraffin wax in the proportions of approximately 80 to 50 per cent wax to 20 to 50 per cent resin.

16. The briquette of claim 15 including said binder being present in the amount of about 0.4 per cent to 33 per cent.

* * * * *